US006400846B1

United States Patent
Lin et al.

(10) Patent No.: US 6,400,846 B1
(45) Date of Patent: Jun. 4, 2002

(54) METHOD FOR ORDERING IMAGE SPACES TO SEARCH FOR OBJECT SURFACES

(75) Inventors: I-Jong Lin, Princeton, NJ (US); Anthony Vetro, Staten Island, NY (US); Huifang Sun, Cranbury; Sun-Yuan Kung, Princeton, both of NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/326,750

(22) Filed: Jun. 4, 1999

(51) Int. Cl.[7] .............................. G06K 9/36; G06K 9/48; H04N 5/208; H04N 1/46; H04B 1/66
(52) U.S. Cl. ...................... 382/199; 382/181; 382/203; 382/236; 382/241; 382/242; 382/243; 382/256; 382/260; 382/266; 348/252; 348/625; 358/532; 375/240.09; 375/240.12
(58) Field of Search ................................ 382/181, 199, 382/203, 242, 243, 254, 260, 266, 268, 269, 263, 190, 195, 225, 226, 236, 238, 241, 256, 274, 240; 348/606, 625, 252, 26; 358/532; 375/240.09, 240.16, 240.12

(56) References Cited

U.S. PATENT DOCUMENTS

| 4,771,469 A | * | 9/1988 | Wittenburg | 382/203 |
| 5,023,920 A | * | 6/1991 | Breu | 382/259 |
| 5,710,833 A | * | 1/1998 | Moghaddam et al. | 382/228 |
| 5,717,463 A | * | 2/1998 | Brailean et al. | 375/240.12 |
| 5,873,081 A | * | 2/1999 | Harel | 707/3 |
| 6,002,803 A | * | 12/1999 | Qian et al. | 382/242 |
| 6,133,921 A | * | 10/2000 | Turkiyyah et al. | 345/420 |

OTHER PUBLICATIONS

Ogniewicz, et al. "Voronoi Skeletons: Theory and Applications", IEEE, pp. 63–69, 1992.*
Ilg, et al, "The Application of Voronoi Skeletons to Perceptual Grouping", IEEE, pp. 382–385, 1992.*
Ogniewicz "Skeleton–Space: a Multiscale Shape Description Combining Region and Boundary Information", pp. 746–751, 1994.*

* cited by examiner

Primary Examiner—Leo Boudreau
Assistant Examiner—Daniel G. Mariam
(74) Attorney, Agent, or Firm—Dirk Brinkman; Andrew Curtin

(57) ABSTRACT

A method determines a surface of an object in a sequence of images. The method begins by estimating a boundary of the object in each image of the sequence using motion information of adjacent images of the sequence. Then, portions of each image of the sequence are ordered to produce an ordered sequence of images. The ordered portions are exterior to the estimated object boundary. Edges in each ordered image are filtered using the motion information, and each ordered image of the sequence is searched to locate the filtered edges to form a new boundary outside the estimated boundary. The filtering and searching are repeated, while projecting the new object boundaries over the sequence of images, until the new object boundaries converges to a surface of the object.

15 Claims, 8 Drawing Sheets

METHOD FOR ORDERING IMAGE SPACES TO SEARCH FOR OBJECT SURFACES

FIELD OF THE INVENTION

This invention relates generally to ordering image spaces, and more particularly, to segmenting video objects.

BACKGROUND OF THE INVENTION

Older video standards, such as ISO MPEG-1 and MPEG-2, are relatively low-level specifications primarily dealing with temporal and spatial compression of video signals. With these standards, one can achieve high compression ratios over a wide range of applications. Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP). These emerging standards are intended to enable multimedia applications, such as interactive video, where natural and synthetic materials are integrated, and where access is universal. For example, one might want to "cut-and-paste" a moving figure or object from one video to another. In order to identify the object, the video must first be "segmented." Given the amount of video, both archived and newly acquired, it is desirable for the segmentation process to be either fully automatic or semi-automatic.

In the semi-automatic case, one may provide a segmentation for the first image. The problem then becomes one of object tracking. In the automatic case, the problem is to first identify the object, then to track the object. In either case, the segmentation process should attempt to minimize the input needed by the user, obviously, no input is optimal.

With VOPs, each image of a video sequence is segmented into arbitrarily shaped image regions. Each VOP describes a video object in terms of, for example, shape, motion, and texture. The exact method of producing VOP's from the source imagery is not defined by the standards. It is assumed that "natural" objects are represented by shape information, in addition to the usual luminance and chrominance components. Shape data can be provided as a segmentation mask, or as a gray scale alpha plane to represent multiple overlaid objects. Because video objects vary extensively with respect to low-level features, such as, optical flow, color, and intensity, VOP segmentation is a very difficult problem.

A number of segmentation methods are known. Region-based segmentation methods include mesh-based, motion model-based, and split-and-merge. Because these methods rely on spatial features, such as luminance, they may produce false contours, and in some cases, foreground objects may be merged into the background. More recently, morphological spatio-temporal segmentation has been used. There, information from both the spatial (luminance) and temporal (motion) domains are tracked using vectors. This complex method might erroneously assign a spatial region to a temporal region, and the method is difficult to apply to a video sequence including more than one object.

The most recent standardization effort taken on by the MPEG committee is that of MPEG-7, formally called "Multimedia Content Description Interface," see "MPEG-7 Context, Objectives and Technical Roadmap," ISO/IEC N2729, March 1999. Essentially, this standard plans to develop a set of descriptors that can be used to describe various types of multimedia information. This description is associated with the content itself and allows for fast and efficient searching of material that is of interest to the user.

It is important to note that this standard is not meant to replace previous coding standards, rather, it builds on other standard representations, especially MPEG-4 since the multimedia content can be decomposed into different objects and each object can be assigned a unique set of descriptors. Also, the standard is independent of the format in which the content is stored. MPEG-7 descriptors can be attached to compressed or uncompressed data.

Descriptors for multimedia content can be used in a number of ways, see for example "MPEG-7 Applications," ISO/IEC N2728, March 1999. Most interesting, for the purpose of the description below, are database search and retrieval applications. In the most general case, the user specifies some attributes of the desired object. These attributes may. include descriptors that describe the texture, motion and shape of a particular object.

The problem of shape representation is not a new problem, but it is a very difficult one. There are many methods that already exist, some of which are based on geometric properties of the closed contour, while others are based on some type of decomposition of the 2D binary signal. As listed in "Description of Core Experiment for Motion/Shape," ISO/IEC N2690, March 1999, a number of proposals have already been made to the MPEG committee. The proposals based on contour include curvature scale space and normalized contour; the ones based on decomposition include wavelet-based contour description, zernlike moments, and multi-layer eigenvector.

All shape descriptors are required to be scale and rotation invariant. Most importantly, the effectiveness of a shape descriptor is judged on its performance in similarity-based retrieval. Therefore, a compact descriptor that is able to capture the structural information of the shape, yet be robust to noise within the boundary is expected to yield the most favorable results.

SUMMARY OF THE INVENTION

The invention provides a method for determining a surface of an object in a video sequence of images. The method begins by estimating a boundary of the object in each image of the sequence using motion information of adjacent images of the sequence. Then, portions of each image of the sequence are ordered to produce a sequence of ordered images. The ordering can use Voronoi ordering. The ordered portions are exterior to the estimated object boundary.

Edges in each ordered image are filtered using the motion information, and each ordered image of the sequence is searched to locate the filtered edges to form a new boundary outside the estimated boundary. The filtering and searching are repeated, while projecting the new object boundaries over the sequence of images, until the new object boundaries converges to a surface of the object.

The surface of the object, i.e., the smooth projection of the boundaries in sequence, can be used to segment the object from the video. The same methodology can also be used for segmenting multiple objects.

DETAILED DESCRIPTION OF PREFERRED EMBODIMENTS

Introduction

Figure 1:
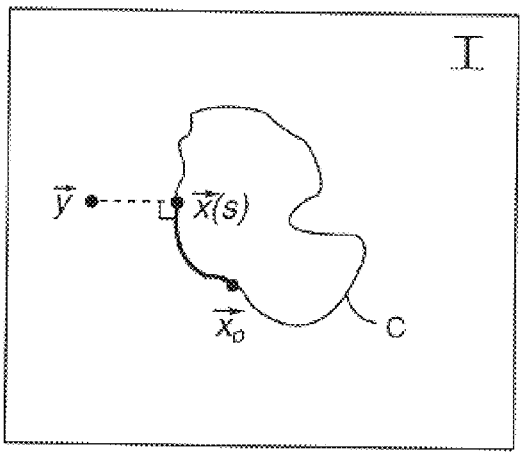
FIG. 1 is a block diagram defining an ordering function.

We describe a simple and effective way of ordering a two-dimensional (2D) space with respect to the exterior of a closed curve. In the examples we present below, the 2D space is an image, and the closed curve represents an estimated boundary of a graphic or video object in the image. The ordering can be used to determine the surface of the object in a sequence of images. We also describe an ordering with respect to the interior of a closed curve to derive a representation of the shape of an object.

In the following, we show that the ordering of the 2D image lends itself well to problems in two particular applications, namely, video object segmentation and shape representation. As we will describe, these two applications rely on an ordering of the 2D space only, however, the method of ordering is easily generalized to higher dimensional spaces, where the closed curve may be replaced by a manifold or N-dimensional surface.

Video Object Segmentation

In a sequence of images, such as a video, the problem of video object segmentation can be stated as follows. Given that one has a 3D space which has an intensity function defined over it, infer a surface of object projections into the space by the intensity function. In other words, video object segmentation must find the region in each of the still images of the video which correspond to the given object.

U.S. patent application Ser. No. 9/219,062 filed Dec. 22, 1998 entitled "Object Boundary Detection Using a Constrained Viterbi Search, " which is now U.S. Pat. No. 6,266,443 issued Jul. 24, 2001 provides a solution to this problem. There, the regions in question are integrated to define a volume which corresponds to the correct segmentation, and locates a corresponding surface whose interior is the volume in question.

Our current solution is still closely aligned with that method, however, the means of locating the corresponding surface is accomplished through a different method, namely an ordering of the 2D image.

Shape Representation

The second problem of shape representation is somewhat related to the segmentation problem, however, rather than defining the object's surface, here we are interested in defining a unique representation for the object's shape.

Formally, this problem is stated as follows. Given the contour of an object boundary, which is taken to be a "snapshot" of the surface of the volume containing an object at a particular time instant, determine a means of representing the defining features of the resulting shape.

As stated above, one of the motivations of having such a representation is to facilitate search and retrieval applications. The problem with many known techniques that find such a representation is that the warping of a particular shape to a structurally similar shape will not always yield a similar representation.

For instance, many popular representation techniques rely on the curvature of shape. However, when the shape is warped in some way, possible by a perspective or affine transformation, it is quite probable that a representation with curvature will yield very different results. Similarly, other methods that rely on wavelet or eigenvector decompositions, or some means of extracting moments, will suffer the same problems.

The key to overcoming this problem is to define a structural representation of the object. In this way, the shape may undergo changes that alter the local characteristics of the boundary without changing the overall structural characteristics of the original shape.

The method that is described for achieving such a structural representation of the shape relies on the same definition of ordering that is used for the segmentation problem.

Definition of Voronoi Ordering

In the solutions to our problems of video object segmentation and shape representation, the ordering of a space with respect to a closed contour is a vital component.

As shown in FIG. 1, given a closed contour C within an image space I, and a starting point $\vec{x}_0$ on C, an ordering function $\phi_C(\vec{y}, \vec{x}_0)$ is defined as:

$$\phi_C(\vec{y} \in I, \vec{x}_0) = \min(\arg_s \min(\|\vec{y} - \vec{x}(s)\|)),$$

$$\begin{cases} C = \{\vec{x}(s) \mid (0 \le s < 1)\}; & \text{Normalized parameterization} \\ \vec{x}(0) = \vec{x}_0; \text{ and} & \text{Starting position} \\ s' = \dfrac{\int_0^{s'} \|\nabla \vec{x}(s)\| ds}{\int_0^1 \|\nabla \vec{x}(s)\| ds} & \text{Perimeter length parameterization} \end{cases}$$

where:

In words, the ordering of a particular point in the image space I is obtained by projecting that point to a parameterized point on the curve. The value of the function at point y is the clockwise distance along the contour C between the closest point on C to y and the starting point. The projection is orthogonal to satisfy the interior minimization in the above equation. In the event that more than one point satisfies this condition, the smallest value of s is chosen.

In contrast to level sets or distance equipotentials, the above ordering function does not directly project the shape of an object into the space, but rather the "flow" around the object. The ordering projects a flexible implication of the object shape onto the image space.

Figure 2A:
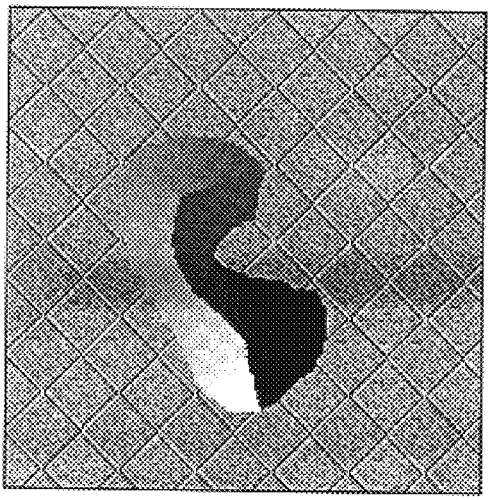
FIGS. 2*a* and 2*b* respectively show Voronoi ordering of outside and inside portions of the curve shown in FIG. 1
Figure 2B:
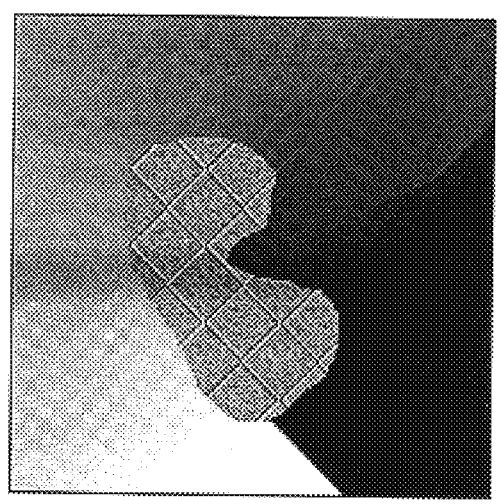

To illustrate the ordering further, FIGS. 2a and 2b show respectively, the ordering imposed on the exterior and interior portions of the image according to the above described function. The "flow" of the ordering is shown light to dark from start to finish.

Determining Object Boundaries

Figure 3:
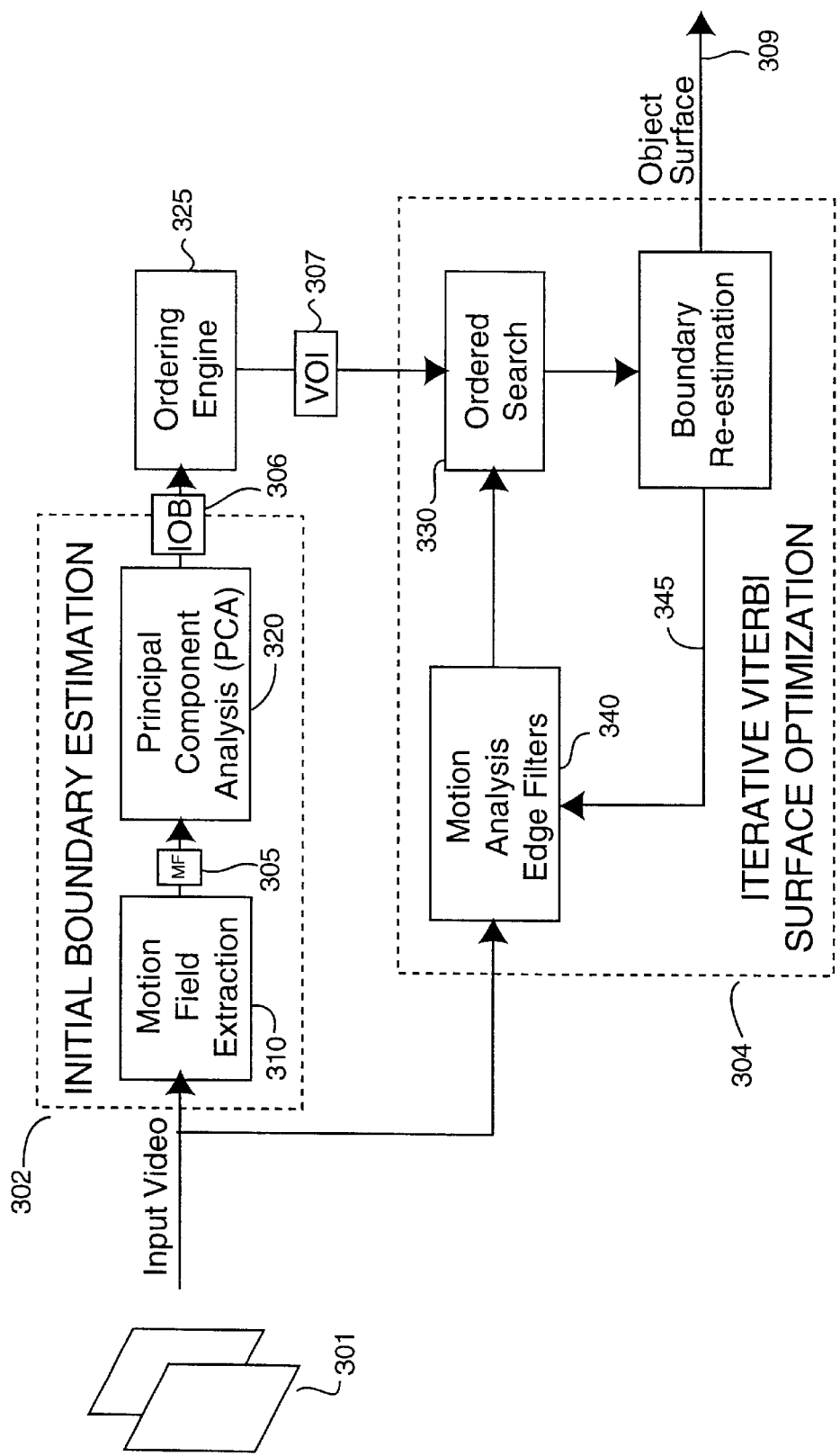
FIG. 3 is a flow diagram of a method for space ordering to perform an object surface search.

FIG. 3 shows a method 300 for determining an object boundary 309 from an input sequence of images, i.e., a video 301. The method includes an initial boundary estimation 302 and an iterative Viterbi surface optimization 304.

Motion Field Extraction

As shown in FIG. 3, using a multi-resolution optical flow, we extract (310) a very dense motion field (MF) 305 from the input sequence of images 301. The key notion here is that if the video 301 includes a video object, then there exists a cluster of pixels in the input video that move together differently than the background. If we assume that the motion is point correspondence from image to image in the sequence, then we can look for a cluster of pixels that move together through the whole image.

A dense motion field is not necessarily informative, unless viewed from the correct angle. There may be a lot of information present in the input video, so we look for a simple representation of the objects within the scene.

All the information presented by a dense motion field can be reduced to a single image cut into regions of similar movement. Thus, after finding all the paths of each pixel, we can summarize information in a three dimensional space through the use of Principal Component Analysis (PCA) 320.

Principal Component Analysis

In general, motion estimation provides a means of correspondence between two images. Assuming that the extracted motion field shows point correspondence over time, we consider the motion path for each pixel in the initial image plane. The velocity of these corresponding points is used as a feature vector that is analyzed through Principal Component Analysis.

In essence, PCA identifies the clusters of pixels in the dense motion field that have substantially similar motion vectors. Pixels at the edge of such groups approximate the object's boundary.

By extracting the first principal component from the velocity of motion paths, we generate a feature vector from the PCA of velocity of the motion path, combined with the initial spatial positions. Because the initial positions are mutually exclusive, these feature vectors form samples of a functional 3-D surface.

The features of the surface are determined as follows. Peaks and saddle points are regions of similar or homogeneous movement that fall off due to motion field analysis jitter and smoothness that mixes the motion path between two motions of two different objects, i.e., motion discontinuity. Just as in any surface, to find peaks and saddle points, we determine where the partials of the surface disappear.

To find the regions associated with the peak, we take a half-height area around the peak, and transform the regions out of Principle Component space back into real space. Finding the motion paths associated with the peaks allows us to transform the peaks into points on the image planes, which in turn estimate a contour of an initial estimated object boundary (IOB) 306.

As shown in FIG. 3, this process completes the process of estimating an boundary. Of course, other methods of estimating an object boundary could be used to accomplish the same task, e.g., dynamic snakes.

It should be noted that the major strength of our method for estimating the object boundary is that our method is able to extract dense motion information and translate this rich information to a manageable and meaningful set of data using PCA. Moreover, the analysis of data in the Principle Component domain lends itself well to detecting multiple objects that are present in the underlying video scene.

Voronoi Ordering of Image using Initial Object Boundary

In step 325 (ordering engine), the estimated object boundary is used to order each of the images 301 as described above. Every point (pixel) in the portion of the image exterior to the initial object boundary is projected onto the closest point on the initial object boundary using the Voronoi ordering function. The Voronoi ordering encodes more information about the initial object boundary by ordering a local area with its perimeter. By ordering the search space, to produce a Voronoi ordered image (VOI) 307, we not only limit the search space, but also allow dynamic programming to find the object's surface 309 over a sequence of images.

Ordered Search

Having estimated the object boundary 306, and the Voronoi ordered image 307 exterior to this boundary, we can now perform an ordered search (330) to locate a set of close contours that better estimate the object's surface 309. These new sets of contours exist outside the estimated object boundary 306, and are found by taking in supplementary information 308 that is derived from the image sequence 301.

It should be noted that the estimated object boundary 306 was determined through motion information alone. The ordered search 330 around the initial object boundary is meant to refine the estimate while still maintaining the approximate shape of the initial boundary.

The ordered search 330 can be defined as follows.

Let I denote the ordered space around an initial contour:

$$C=\{\vec{x}(s)|(0 \leq s<1)\},$$

and let:

$$C'=\{\vec{x}'(s)|(0 \leq s<1)\}$$

be the new contour that encloses C.

Given some objective function $J(\vec{x}'(s))$, which is a function of the image intensity at the point $\vec{x}'(s)$, we can use dynamic programming to find C'. The objective of the dynamic programming procedure is to maximize the cost while maintaining an ordered path. A path is ordered around C only if the following condition is satisfied:

$$\frac{d}{ds}[\phi_C(\vec{x}'(s), \vec{x}_0)] > 0, 0 \leq s < 1$$

Essentially, the above condition will ensure that the new set of contours follow a path in which the order is always increasing, i.e., the ordering of C' is monotonically increasing with its parameterization. This prevents the path from oscillating and backtracking to points in the space that do not preserve the global characteristics of the initial contour C. Of course, some deviation is allowed, but it is constrained to be within the limits defined by the ordered space.

Motion Analysis Edge Filter

In the ordered search 330, the objective function is used to determine the path that is ultimately chosen. In one form, the objective function determines the edge strength at each point in the image. The major drawback to this form is that the images include a lot of useless information that does not directly pertain to true object boundaries. In some sense, the raw edge information could be considered as noise and it needs to be filtered 340.

To filter the edge information, we again make use of motion. Because motion at the object boundary is usually discontinuous, it is difficult to estimate. Therefore, we leverage the visual information and enhance this information with motion. Edges that contain discontinuous motion are most likely points on the object boundary, hence these edges are enhanced. In contrast, edges that exhibit continuous or coherent motion are most likely non-boundary points, hence these are diminished.

Below, we described how the edge map can also be used to infer smoothness between the contours of multiple images. We do this by giving bias to the time projection of object boundaries in neighboring images. This iterative feedback 345 process is described next. Smoothly projecting the object's boundaries over time (the sequence of images) converges on the surface of the object.

Iterative Viterbi Surface Optimization

Because objects tend to have smooth surfaces, we can iteratively search for the object's surface while keeping in mind these smoothness constraints. Essentially, we re-estimate the boundary through an iterative process that accounts for the ordering of our initial boundary and motion enhanced edge information. The approach taken is similar to that described in U.S. patent application Ser. No. 9/219,062 referenced above. A solution for the single image problem is first solved using contour optimization. Next, the solution is worked into an iterative framework, and generalized for multiple images using surface optimization.

First, consider the solution to the single image problem. Our goal is to find a contour using the ordered search 330. A score function is of the form:

$$\max(E(x_1, \ldots, x_n, x_{(n+1)}) = f_{score}(\max(E(x_1, \ldots, x_n), x, y)))$$

where $(x_1, \ldots, x_n, x_{(n+1)})$ is a path, $(x_1, \ldots, x_n)$ is another path minus one pixel, and x, y represents coordinates in the warped image resulting from ordering.

By considering each pixel on the image as a node in the graph and connecting only the nodes in which the order is strictly increasing and the pixel is adjacent, it becomes evident that the problem reduces to the shortest path algorithm on a directed acyclic graph. The problem can be solved with a breadth-first application of our score function, while keeping track of the maximum score at any point. The computation is equivalent to the application of the Viterbi method applied to a trellis that is created from the ordered and adjacent pixels.

Thus far, the contour optimization on a single image has been described. Now, to overcome the complications that arise from the dynamic interactions between contours in different images, we rely on an iterative surface optimization technique that re-estimates the object boundary.

To accomplish the surface optimization, an energy function of the surface S is formulated:

$$E(S) = c_1 \cdot E_{motion}(S) + c_2 \cdot E_{visual}(S) + c_3 \cdot E_{smooth}(S),$$

where the terms respectively express motion discontinuity, visual discontinuity, and smoothness. The energy function at a point can be split into two parts.

The first part is dependent on the intensity of the image or the shape of the surface and accounts for motion and visual discontinuity. These energies are external and force the surface outward and are accounted for in the initial boundary estimates and motion edge analysis.

The second part is dependent of the shape of the surface through time; this is an internal energy and provides a structural constraint. It should be noted that alone, smoothness is a rather weak structural constraint, however, in conjunction with the defined ordering of a space, the structural constraint becomes very powerful.

To incorporate the smoothness into the surface optimization, each boundary is projected as a strong edge into the motion enhanced edge image of the previous and next images. This time projection onto the edge/motion scoring allows the future iterations of the boundary re-estimation to approach some level of convergence and achieve surface smoothness through time.

After the object's surface (boundaries over time) has been located, it is straightforward to segment the object from the sequence of images.

Multiple Objects

Although our method of object segmentation has only been discussed in the context of a single object, the method can be extended to multiple objects.

To provide some further insight, we briefly describe the segmentation of multiple objects under two different assumptions: first, with little or no occlusion, and second, with a high degree of occlusion. In either of these two cases, initial object boundaries are estimated for each of the multiple objects. From the extracted motion field, PCA can be performed in the same way, however, much more care must be put into the procedure which maps the functional surface back to the image space. This procedure may be required to know the number of objects in the scene, just as a K-means clustering procedure knows the initial number of partitions.

No Occlusion

If there is no occlusion in the images, and the initial object boundary estimates were correctly extracted, then the multiple object boundaries appear as disjoint non-overlapping regions. These regions are then separately ordered by the ordering engine step 325, and presented individually to the iterative Viterbi surface optimization step 304.

Occlusion

In the event that there is occlusion among the multiple video objects, the iterative Viterbi surface optimization is concurrently done on each of the Voronoi ordered images. Similar to the smoothness that we impose by the time projection of boundaries from neighboring images, we can spatially project the boundaries of neighboring objects so that we maintain a consistent definition between adjacent objects. By doing so, the boundaries of neighboring objects can satisfactory converge to the true boundaries.

Representing Object Shapes

In the discussion above, we described the uses of Voronoi ordering on the portion of that image that is exterior to the object's boundary C. In the complementary interior space of C, the ordering has complementary functionality. While we use the outside projection of the ordering in the search for an object boundary, we use an inside projection of the ordering for object shape representation.

We describe how this representation is derived from the simple manipulation of ordering and will refer to this representation as a Perimeter Weighted Medial Axis (PWMA). Furthermore, we describe that this representation can be robustly transformed to a new data structure, which we will refer to as a Partially Ordered Tree (POT). Lastly, we describe a dynamic programming method that matches the structure, or has the ability to compare multiple partial ordered trees.

Perimeter Weighted Medial Axis

The PWMA is defined by a function $\chi_c$ over the interior of C:

$$\chi_C(\vec{x}) = \max_{\|\vec{u}\|=1}\left(\min\left(\begin{array}{c}|\phi_C(\vec{x}+r\vec{u})-\phi_C(\vec{x})|,\\ |1-\phi_C(\vec{x}+r\vec{u})+\phi_C(\vec{x})|\end{array}\right)\right), 1 \gg r > 0$$

In words, the above function includes the values of any discontinuous steps in the ordering that are experienced within the initial object boundary C.

First, we observe that $\chi_c$ is zero over most of the interior portion of the image. In the simple case, if the boundary is a circle, we find that it is zero everywhere except at the center point, where it has the value one-half. Second, when a point is non-zero, the point is equidistant between two non-adjacent points in the boundary. The value of that non-zero point is a minimum distance along the perimeter between those two nonadjacent points, i.e., the length of the boundary that the non-zero points span.

In other words, the $\chi_c$ represents a "skeleton" of the shape of the object; furthermore, it is a skeleton that is "weighted" such that extremities have a lower value than the central points.

If C is a simple closed contour, then another property of the PWMA is that the non-zero points always form a tree whose root node is the maximum value and descendant nodes decrease in value. Furthermore, it is clear that the shape of the object has some implication on the PWMA. Thus, the structural warping at "joints" in the PWMA can be accounted for.

Transforming PWMA to an Ordered Tree

Given that the PWMA leads to a compact representation as a rooted tree, it becomes necessary to define a robust method for comparing these tree structures. The comparing method must be robust in structural matching and also to structural variability.

When we talk of structural matching, we determine the optimal correspondence of all nodes and edges in one tree to another tree. The structural matching of one tree to another tree is related to the problem of graph isomorphism, a currently open problem, possibly lying in difficulty between P and NP-complete problems. The key observation for our problem is that the PWMA leads to an ordered tree.

The PWMA is transformed to an ordered tree with the following steps:

1. The root node of the tree is at the maximum value of the PWMA.
2. Each edge in the tree represents the PWMA line segment between any two nodes.
3. Each node corresponds to a point in the PWMA where three or more non-zero lines of equidistant spacing intersect, or where one ends.
4. The parent-child relationship runs in the direction of decreasing value of the PWMA, i.e., descendant nodes represent weaker segments of the PWMA.

The final observation is that our PWMA structure lies in a 2-D plane and can be ordered with respect to their counter-clockwise angle. The simple PWMA structure is an ordered tree with the above properties. Nodes represents segmentation points, and edges represent information between segmentation points.

Comparison of Ordered Trees

For ordered trees, the analysis for matching is relatively straightforward, see Cormen et al. in "Introduction to Algorithms," MIT Press, 1990. Consider two trees and their children: a mutually recursive relation for a match falls out via a sequence matching problem.

Figure 4:
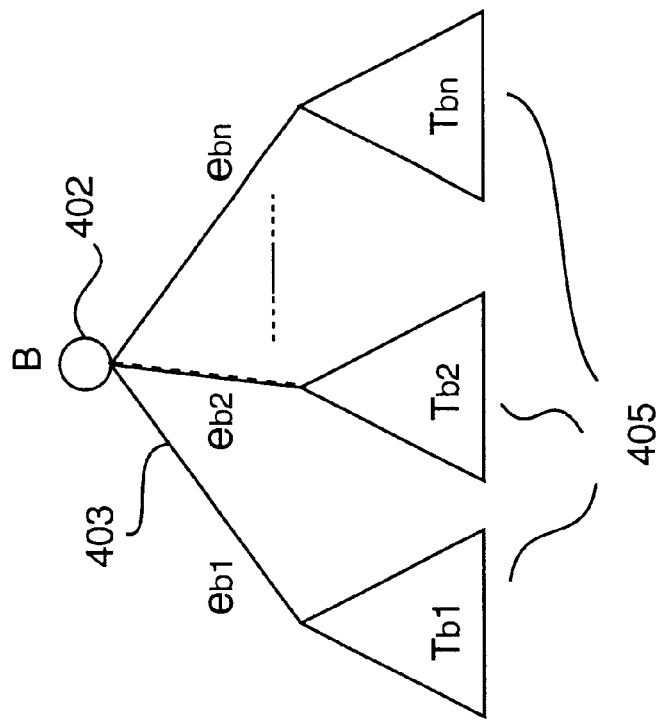
FIG. 4 is a diagramatic of two ordered trees to be matched according to the invention.
Figure 4:
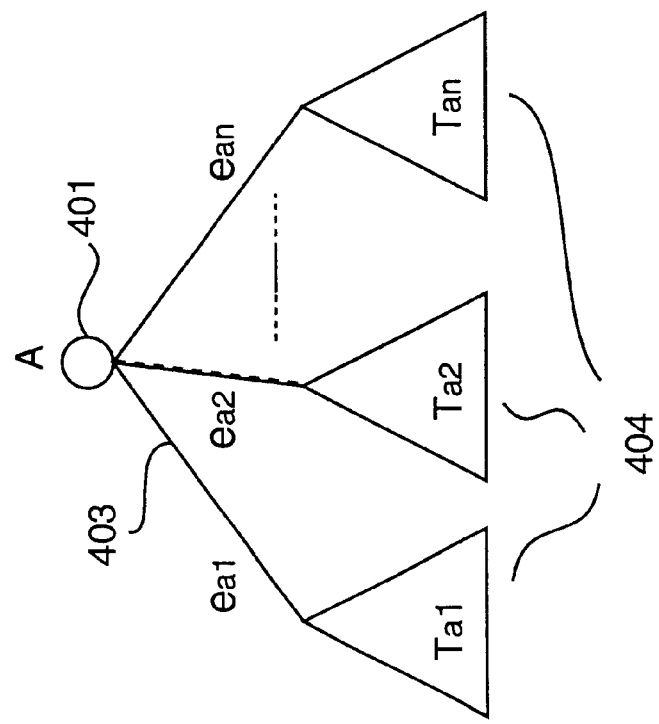

As a basis, we let two trees containing only a root node match perfectly. For trees A 401 and tree B 402 in FIG. 4, we use a longest common subsequence (LCS) comparison procedure for our inductive step.

$$OrderedTreeCompare(A, B) =$$
$$LCSCompare\left(\begin{array}{c}((e_{a1}, T_{a1}), (e_{a2}, T_{a2}), \ldots, (e_{an}, T_{an})),\\ ((e_{b1}, T_{b1}), (e_{b2}, T_{b2}), \ldots, (e_{bn}, T_{bn}))\end{array}\right),$$

where $e_{an}$ and $e_{bn}$ are edges 403 to sub-trees $T_{an}$ 404 and $T_{bn}$ 405. Recursion occurs by calling the TreeCompare procedure to match the subtrees within the sequence, i.e., $$LCSElementCompare = f(e_{ai}, e_{bj}, OrderedTreeCompare(T_{ai}, T_{bj}))$$

Note that, as with all dynamic programming problems, there are only a finite number of tree comparisons that can be made. Thus, the computational cost of ordered tree is bounded by:

(the number of nodes in A)*(the number of nodes in B)*(Cost of LCSCompare).

Furthermore, this type of structural matching is robust to missing branches.

A problem is due to noise induced by the segmentation. In this process, it is clear that only subtrees of the same depth will be compared. Thus, if an extra node and edge are spuriously added into the tree due to noise in the segmentation method, its children increase in depth and this small misalignment will force a serious mismatch.

Partially Ordered Tree

Figure 5:
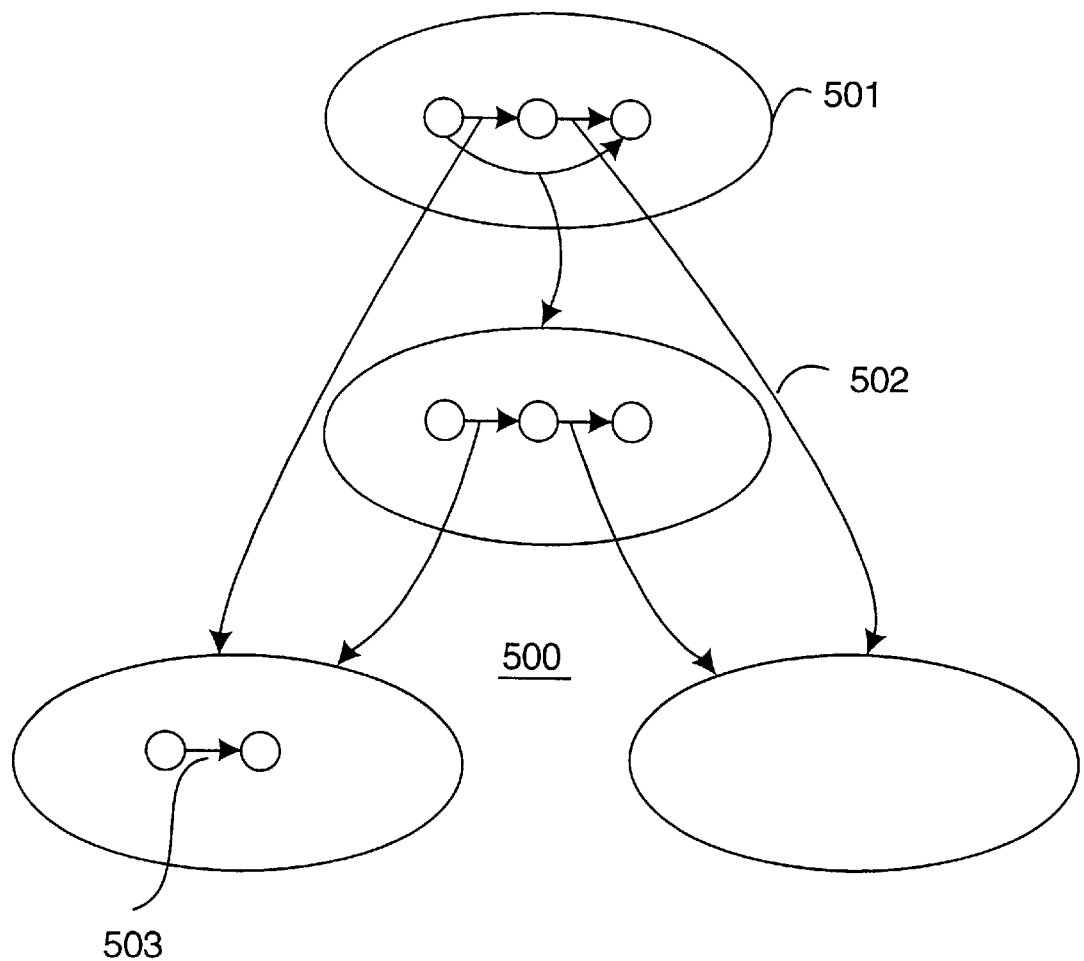
FIG. 5 is a diagramatic of a partial ordered tree.

As shown in FIG. 5, we introduce a new data structure called a Partially Ordered Tree (POTs) 500 to force a new level of robustness during our PWMA matching. A partially ordered tree is a recursive graph-like data structure. In FIG. 5, major components (e.g., nodes 501, edges 502) are shown with bold lines, while minor components are shown with thinner lines 503.

A POT-major node in a partially ordered tree contains a single source/single sink directed acyclic graph (DAG) whose edges we will refer to as POT-minor edges, and whose nodes we will refer to as POT-minor nodes. The POT-minor edge contains a data vector and a reference to another POT-major node called a POT-major edge.

When we refer to the POT-major graph, we refer to the graph that POT-major elements induce. When we refer to the POT-minor graph of a POT-major node, we refer to the DAG that the POT-major node contains. The POT-major graph has a two special constraints: 1) a sub-graph of the POT-major graph is a rooted tree; and 2) any edges that are not in this rooted tree only go from a node to its descendant. Note, ordered trees are a special case of POT trees, where each POT-minor graph is merely a linear graph.

Transforming the PWMA to a Partially Ordered Tree

As mentioned above, the ordered tree is a special case of the Partially Ordered Tree and will be the starting point to transform a PWMA to a partially ordered tree. To obtain our initial structure, the same transformation of a PWMA to an Ordered Tree is performed. Into the POT, we code alternate segmentation and representations by adding parallel paths into our POT-minor graphs.

Figure 6:
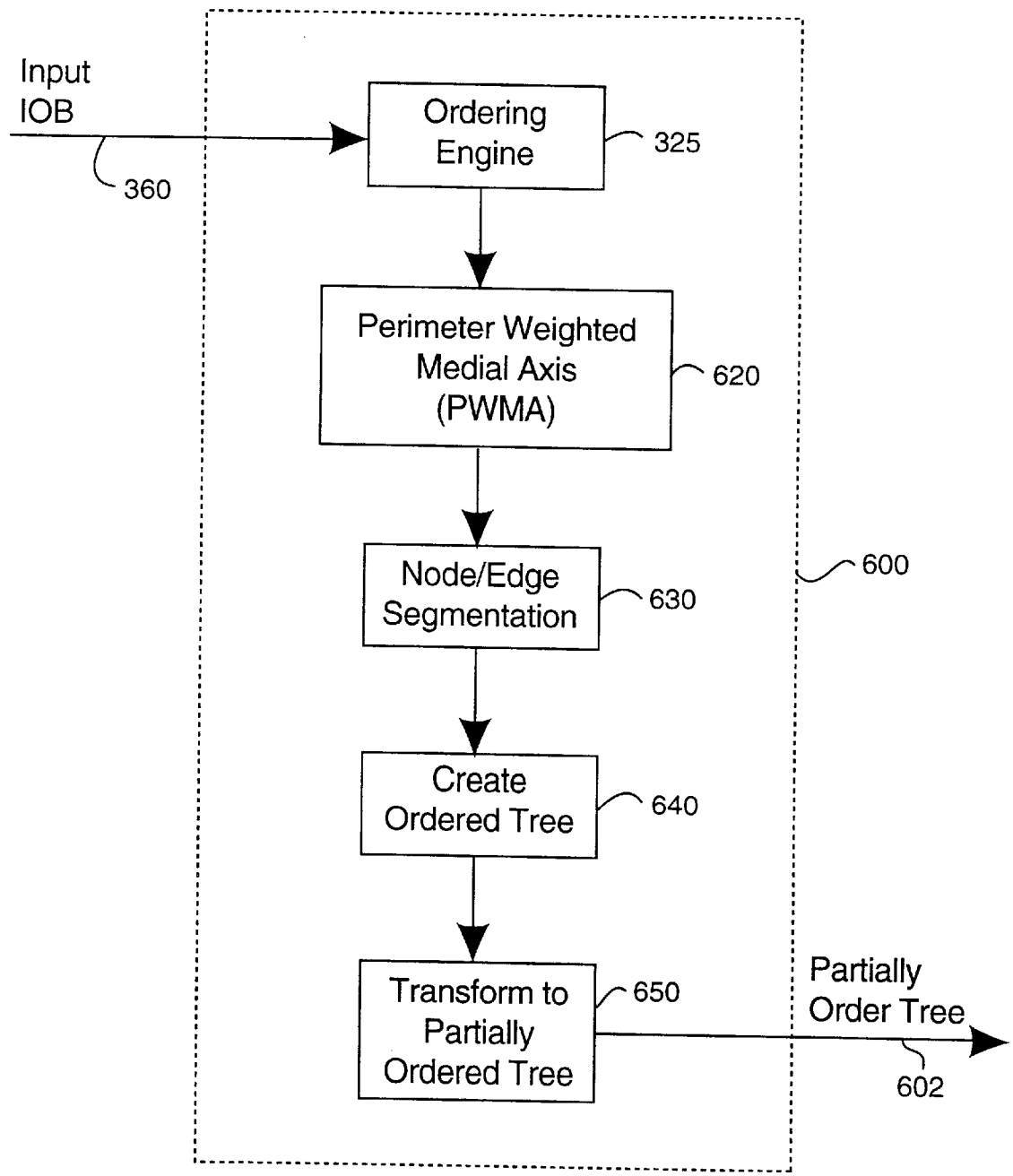
FIG. 6 is a flow diagram of a method for converting a contour to a partial ordered tree.
Figure 7A:
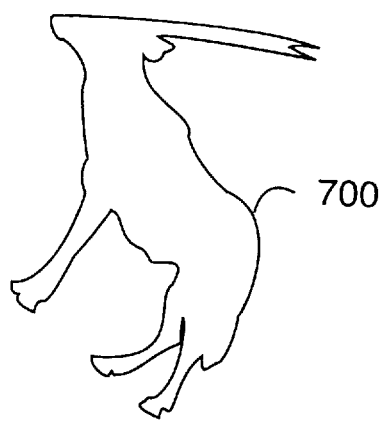
FIGS. 7a–e are respectively an objects, and graphs of its medial axis, a segmented medial axis, an ordered tree, and a partially ordered tree.
Figure 7B:
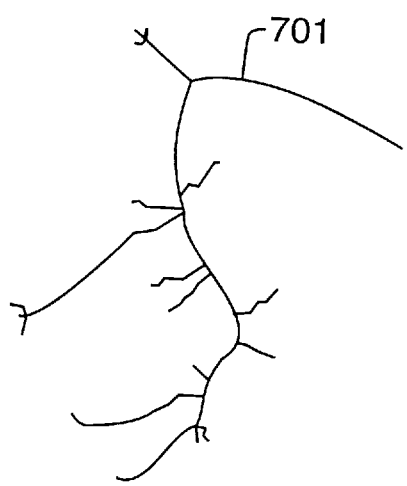
Figure 7C:
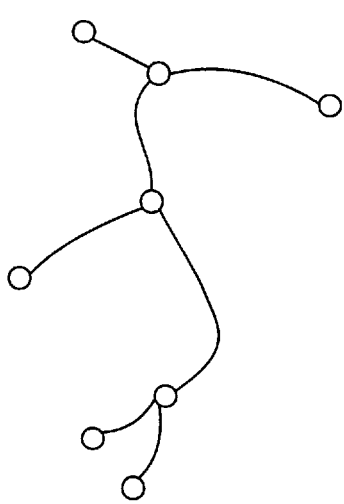
Figure 7D:
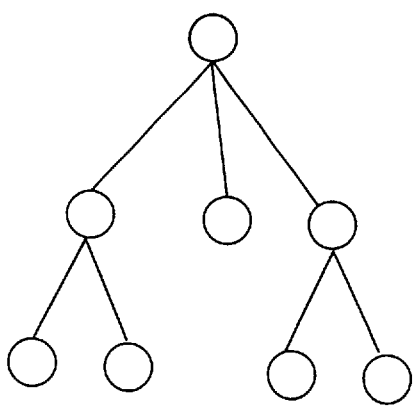
Figure 7E:
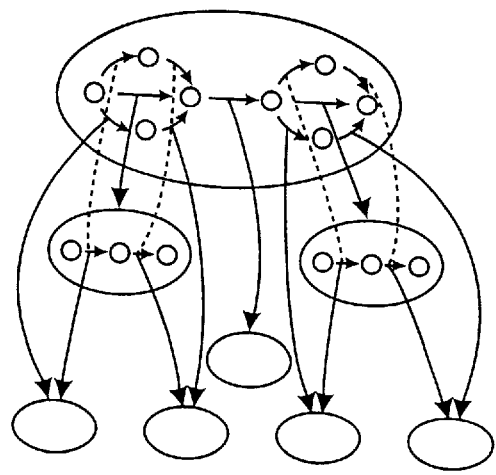

As shown in FIGS. 6 and 7, the input is an initial object boundary 306 and the output is a partially ordered tree 609, and the steps in the transformation are:

1. Impose (Voronoi) ordering (325) on the interior portion of an object defined by a boundary 700 as shown in FIG. 7a.
2. Derive (620) PWMA 701 from the ordering 620. In FIG. 7b, the relative thickness of the "skeleton" of the shape of the object is indicative of the weight of the PWMA such that extremities have a lower value than the central points.
3. Segment (630) PWMA 701 by nodes and edges 702 (FIG. 7c).
4. Generate (640) an ordered tree 703 from the segmented PWMA (FIG. 7d).
5. Transform (650) the ordered tree to a partially ordered tree 704 (FIG. 7e).

In contrast with an ordered tree, the freedom in structure in a POT allows us to encode complex information such as duality and robustness to structural variation. Although the core of the POT is still the original ordered tree and there exists a simple isomorphism between the nodes of the ordered tree and the partially ordered tree, the partially ordered tree has more flexibility with the partial ordering of its descendants, and more paths to its descendants.

The parallel paths in the POT-minor graphs encode different possible segmentations on each branch. Thus, to account for the case where a segment can be skipped, the POT-minor arcs from the next POT-major child are copied in as a parallel path. To account for the possibility of a spurious node, we can add the possibility of ignoring the node by adding a parallel path in the POT-minor graph and bypassing the node in question with an extra POT-major edge.

POT-Compare

The structural comparison of POTs have a similar analysis to the ordered tree, but instead of using a LCS-Compare, we use a DAG-Compare algorithm, see, Lin et al. in "Coding and Comparison of DAGs as a novel neural structure with application to on-line handwritten recognition," IEEE Trans Signal Processing, 1996):

POTCompare(A, B)=DAGCompare(A.current_dag, B.current_dag)

The element matching of sequence is replaced by the matching of edges in the DAG. The recursion occurs by calling the POT-Compare function to matching the subtrees associated with edges of the DAG, i.e., MatchEdge=$f(e_{ai}, e_{bj}, \text{POTCompare}(\text{POT}_{ai}, \text{POT}_{bj}))$ Note that, as with all dynamic programming problems, there are only a finite number of POT comparisons that can be made. Thus, assuming the POT-compares dominate the computation, the computational cost of ordered tree is bounded by:

(the number of nodes in A)*(the number of nodes in B)*POT-Compares.

Figure 8:
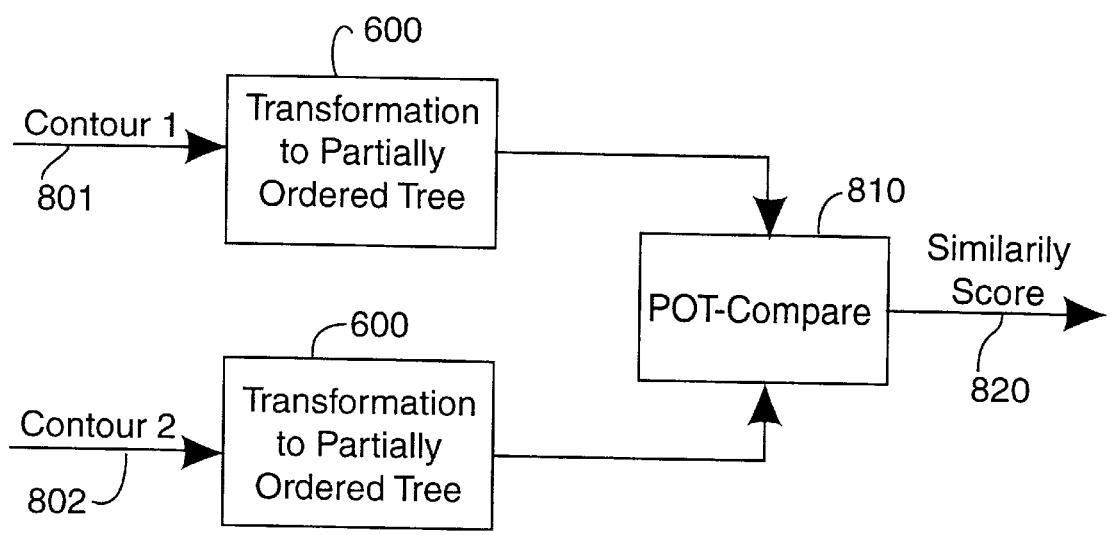
FIG. 8 is a flow diagram of a method for comparing partially ordered trees.

FIG. 8 shows a simple system 800 in which two contours 801—801 are first independently transformed 600, then compared 810 using the procedures described above to obtain a similarity score 820.

Application: Shape Query

The structure of the Partially Ordered Tree complemented by the POT-Compare process gives a method of comparison, robust not only to missing edges, but also to the spurious segmentation points. By transforming an object's medial axis to this intermediate POT representation and using the POT-Compare as a similarity measure, given a shape, we can find other shapes that are intuitively similar to it.

Figure 9:
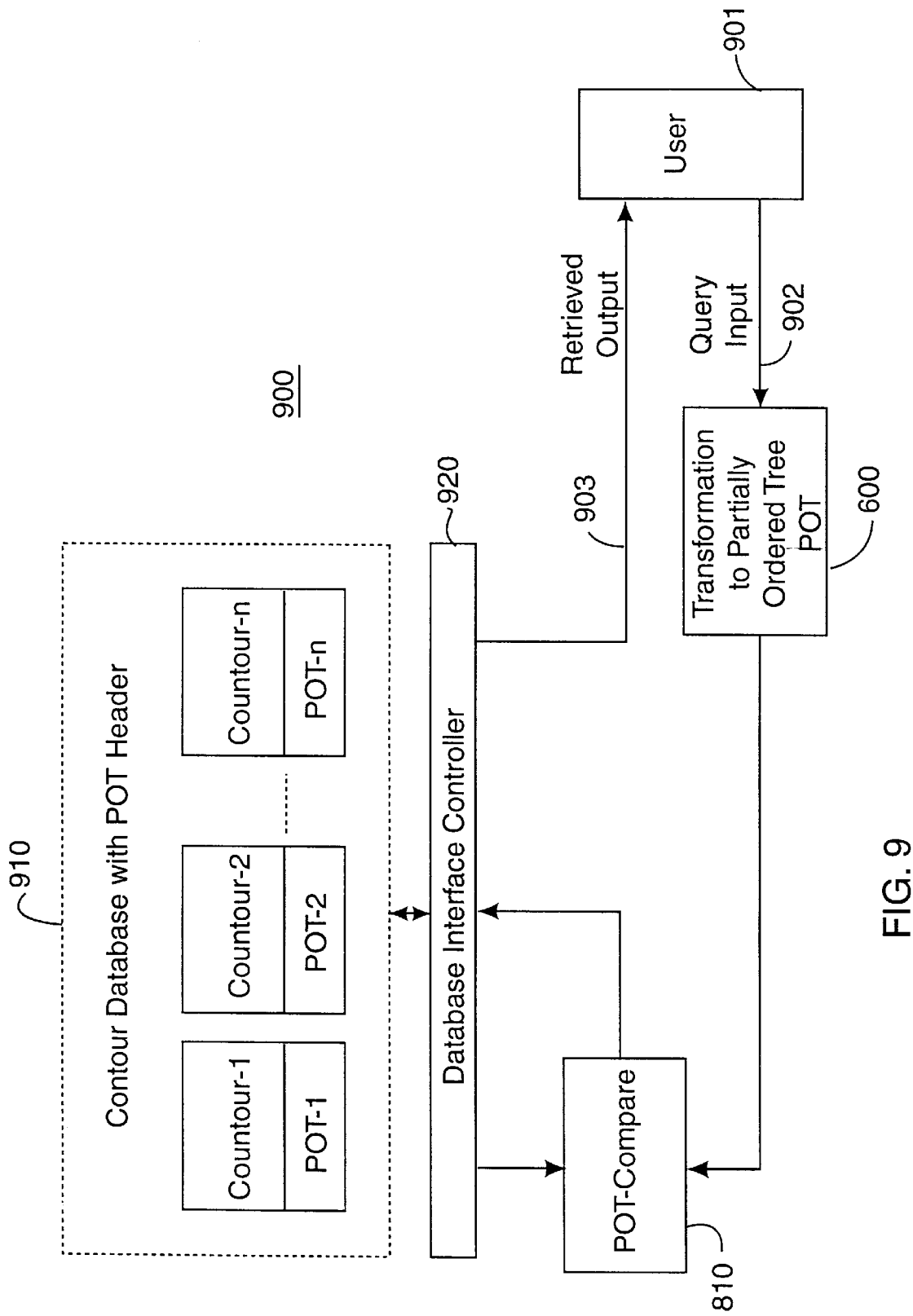
FIG. 9 is a block diagram of a system for comparing object shapes.

FIG. 9 shows a database retrieval system 900 to accomplish this task. In the database retrieval application, a user 901 will query a database or series of databases 910 with an input query 902. The query can be in the form of an image, an object boundary, or the like. The query can be either hand-drawn or locally available. The database interface controller 920 retrieves output 903 that is similar to the input.

As a first step, the query is transformed into a Partially Ordered Tree 600. Step 810 compares the transformed contour (POT) to those stored in the database 910. To enable a fast and efficient search procedure, it is assumed that the contour database consists of many contours, each with associated header information, which contains a pre-computed POT representation.

Attaching such header information to multimedia content is in fact the intention of the emerging MPEG-7 standard. A database interface controller exists outside of the database itself to control requests of certain data. To make comparisons with the query, the controller will deliver the POTs of the database contours to the POT-Compare 810. As described earlier, the output of the POT-Compare is a similarity score. Based on this value, the most similar contours 903 will be retrieved for the user.

In summary, the POT representation of PWMA and the POT-Compare have many useful qualities that enable efficient and robust query of shape:

1. Compression—the POT representation of PWMA is a more compact way of expressing the shape than the raw points.
2. Scalability—the POT representation of PWMA can be thresholded at different levels for different degrees of detail; furthermore, the POT-Compare is robust to these changes in detail.
3. Shape Flexibility—the POT representation PWMA also encodes an idea of structure that is amenable to bending at joint while still maintaining similarity scores.
4. Robustness—the POT representation encodes multiple representations of structure of the PWMA; the POT-Compare efficiently checks all these possible representation against each other with dynamic programming algorithm in polynomial time and gives a robust similarity measure.
5. Adaptiveness—With the POT representation, the POT-Compare may also keep track of which paths are being used during query. A system may choose to adaptive prune the POT representation to adjust the similarity measure.
6. Generalization—With the POT representation, the building of representation for classes of shapes can be explored by structurally merging similar substructures together.

We have described a way of ordering a space with respect to the exterior and interior of a closed curve. The first ordering can be used to determine the boundary of an object over a sequence of images, and the second to represent the shape of an object. Both determinations have applications in video feature extraction applications.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a surface of an object in a sequence of images, comprising the steps of:

estimating a boundary of the object in each image of the sequence using motion information of adjacent images of the sequence;

ordering portions of each image of the sequence to produce an ordered sequence of images, the ordered portions being exterior to the estimated object boundary;

filtering edges in each image using the motion information; and searching each ordered image of the sequence to locate the filtered edges to form a new boundary outside the estimated boundary in each ordered image;

repeating the filtering and searching, while projecting the new object boundaries over the sequence of images, until the new object boundaries converges to a surface of the object.

2. The method of claim 1 wherein the estimating further comprises:

extracting a motion field from the sequence of images; and applying principle component analysis to the motion field to estimate the boundary of the object in each image.

3. The method of claim 1 wherein the ordering projects pixels in exterior portions onto a closest point on the estimated object boundary using a Voronoi ordering function.

4. The method of claim 1 wherein the searching further comprises:

maximizing a cost of an objective function while maintaining an ordered path around the estimated object boundary.

5. The method of claim 4 wherein the ordered path is monotonically increasing. with respect to the ordering.

6. The method of claim 4, wherein the objective function is a function of image intensity around the object boundary.

7. The method of claim 1 wherein the filtering further comprises:

increasing edges of the image having discontinuous motion; and decreasing edges having coherent motion to smooth the surface of the object over the sequence of images.

8. The method of claim 1 wherein the sequence of images includes multiple objects and further comprising:

determining the surface of each of the plurality of objects.

9. The method of claim 8 the object surfaces are determined individually by the searching when the objects are non-occluding.

10. The method of claim 8, the object surfaces are determined concurrently by the searching when the objects are occluding.

11. The method of claim 1, wherein the repeating further comprises:

optimizing the object boundary in each of the ordered images by maximizing a score function; and optimizing the object surface across the sequence of ordered images by using an energy function.

12. The method of claim 11, wherein the energy function includes terms representing motion discontinuity, visual discontinuity and smoothness.

13. A computer implemented method for estimating a boundary of an object within an image, comprising:

selecting a start point on a contour representing an initially estimated boundary of an object within an image;

applying each of multiple points within the image and exterior to the contour, to an ordering function to determine a distance from the contour start point and along the contour which corresponds to each of the multiple points;

projecting each of the multiple points onto the contour based on the determined distance; and generating a re-estimated boundary of the object based on the projection of the multiple points on the initially estimated contour.

14. A method according to claim 13, wherein the contour is defined by multiple contour points, and further comprising:

identifying a contour point, within the multiple contour points, closest to the determined distance, along the contour from the contour start point, which corresponds to each of the multiple points exterior to the contour;

wherein each of the multiple points exterior to the contour is projected to the identified contour point closest to the determined distance, along the contour from the contour start point, corresponding to that point.

15. A method according to claim 14, further comprising:

initially identifying more than one of the multiple contour points to be closest to the determined distance, along the contour from the contour start point, which corresponds to one of the multiple points exterior to the contour; and determining a distance along the contour from the contour start point to each of the initially identified contour points;

wherein the identified closest contour point corresponding to the one point is the one of the initially identified contour points determined to have a shortest of the determined distances along the contour from the contour start point.

* * * * *